Oct. 9, 1951  B. ROZETT  2,570,488
ENGINE ACCESSORY TESTING METHOD AND APPARATUS
Filed June 10, 1947  4 Sheets-Sheet 1

Inventor:
Benjamin Rozett.
By Chritton, Schroeder
Merriam & Hofgren
Attorneys

Oct. 9, 1951   B. ROZETT   2,570,488
ENGINE ACCESSORY TESTING METHOD AND APPARATUS
Filed June 10, 1947   4 Sheets-Sheet 2
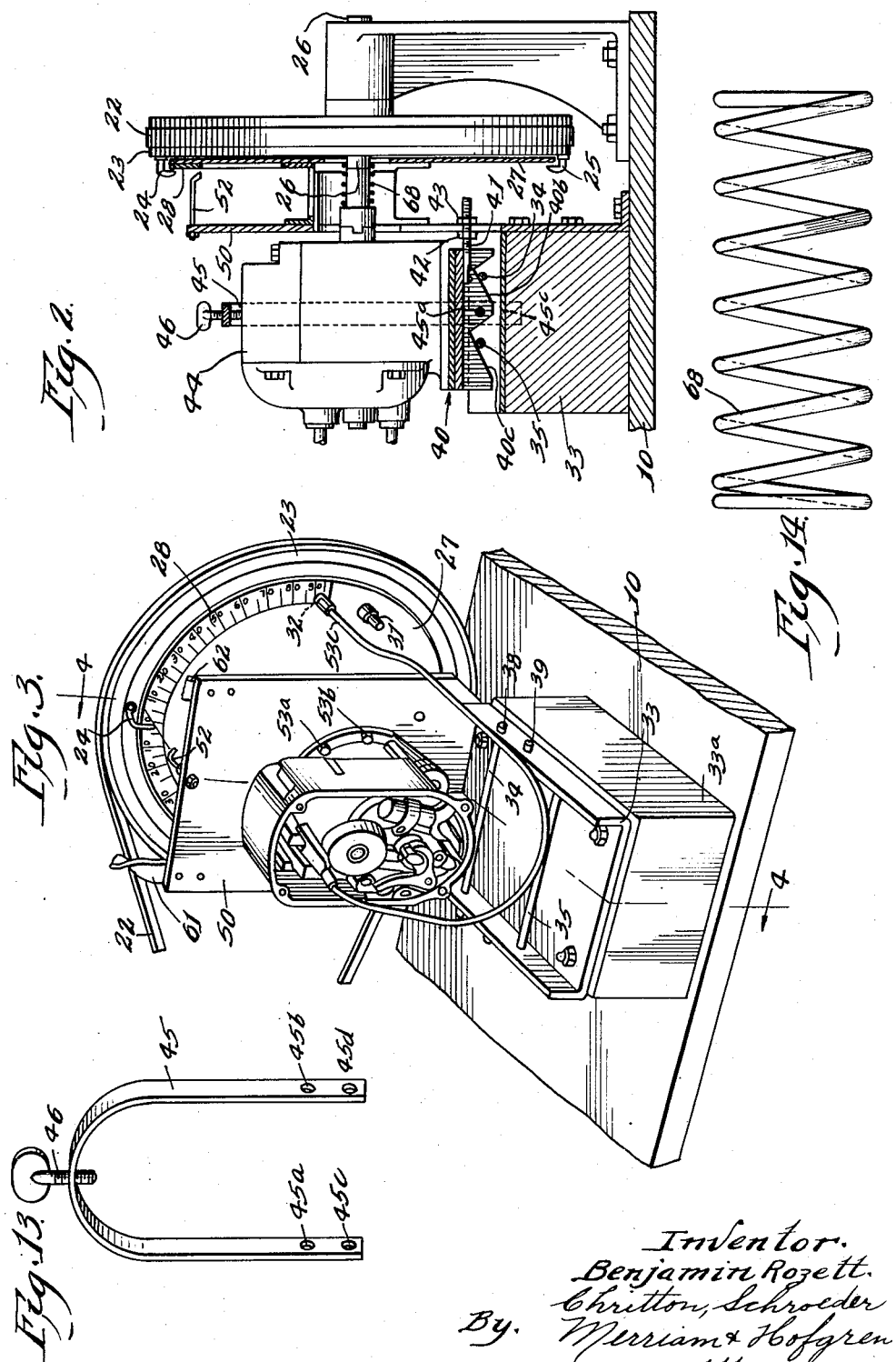
Inventor.
Benjamin Rozett.
By Chritton, Schroeder, Merriam & Hofgren
Attorneys.

Oct. 9, 1951  B. ROZETT  2,570,488
ENGINE ACCESSORY TESTING METHOD AND APPARATUS
Filed June 10, 1947  4 Sheets-Sheet 3
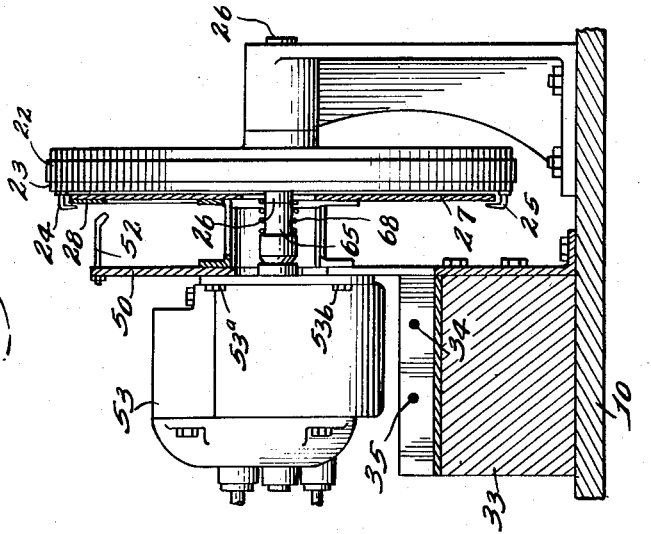
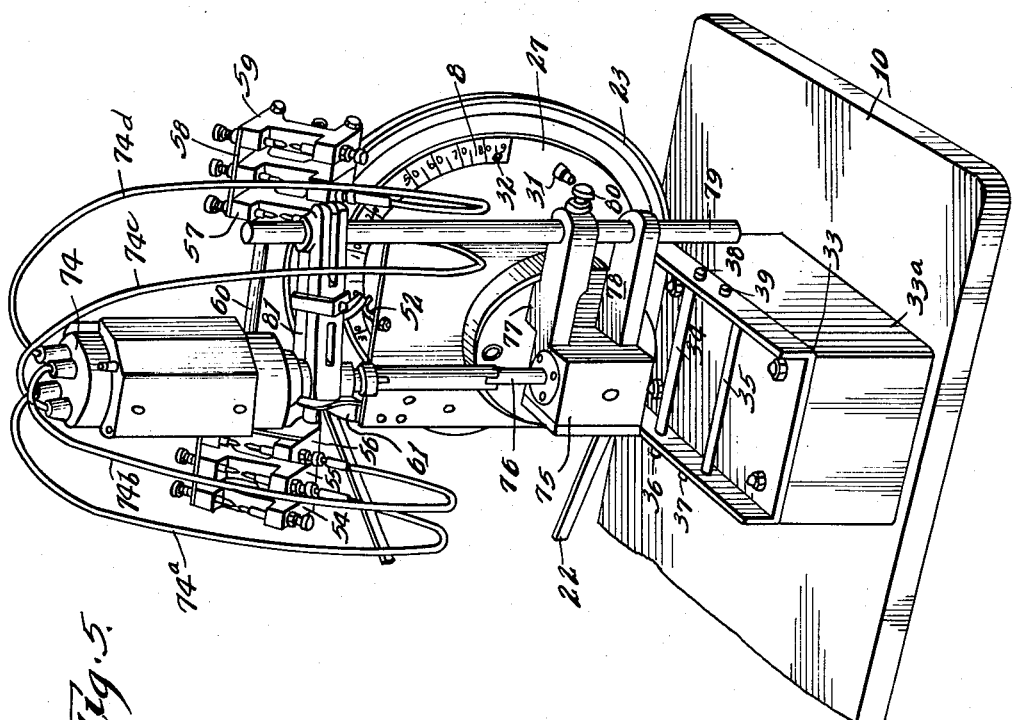
Inventor:
Benjamin Rozett.
Chritton, Schroeder,
By  Merriam & Hofgren
Attorneys

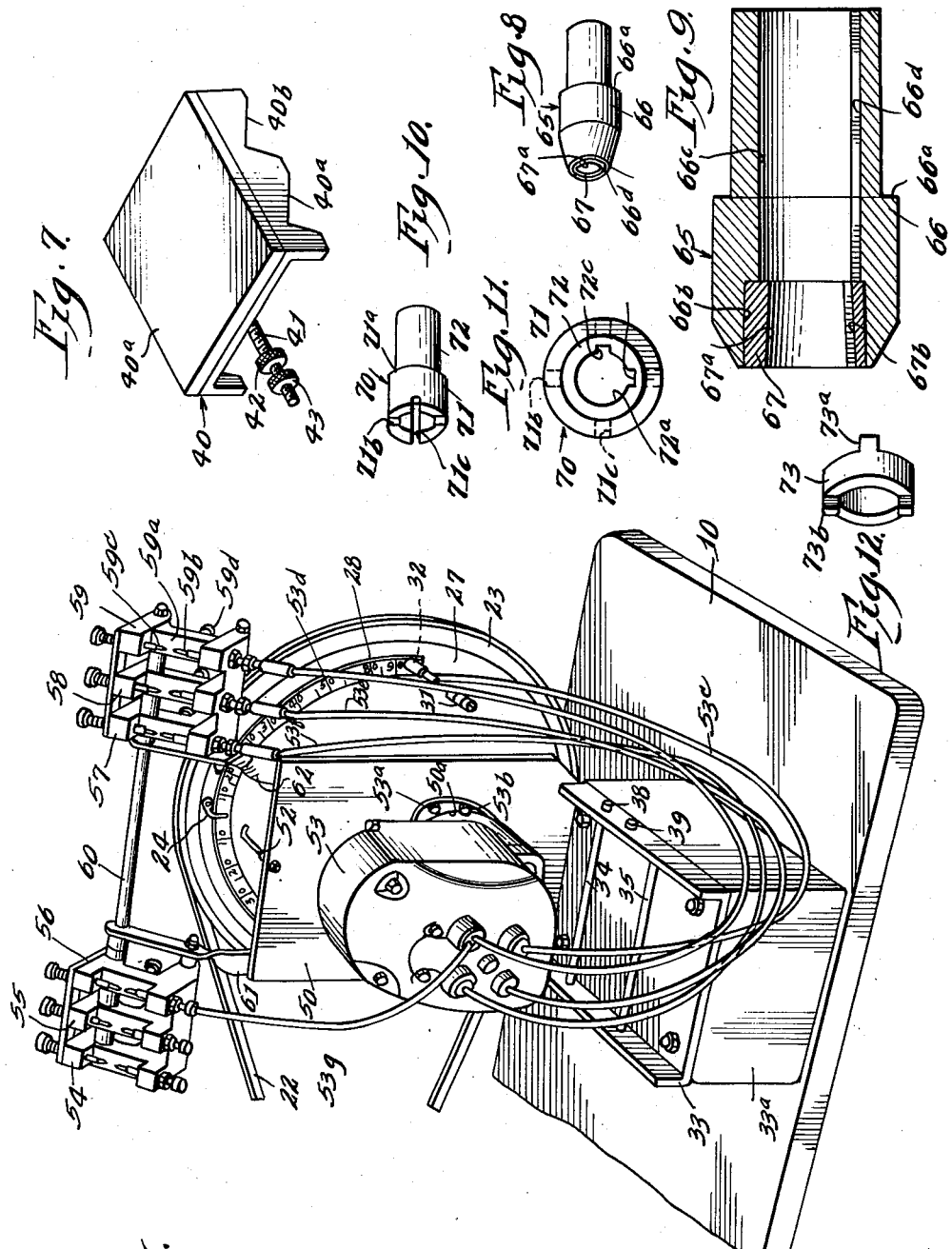

Patented Oct. 9, 1951

2,570,488

UNITED STATES PATENT OFFICE 2,570,488

ENGINE ACCESSORY TESTING METHOD AND APPARATUS

Benjamin Rozett, Chicago, Ill., assignor to Joseph Weidenhoff, Inc., a corporation of Illinois Application June 10, 1947, Serial No. 753,623

17 Claims. (Cl. 175—183)

This invention relates to an engine accessory testing method and apparatus, and more particularly to improved means for testing magnetos.

Most magnetos used in conjunction with various internal combustion engines are of the multipole type and are so arranged that the magneto generates two or more high voltage impulses during every revolution of the magneto rotor or shaft. If the multi-lobed cam of a magneto does not cause the breaker points or contacts to break or open in proper radial location during a complete revolution (360°) as for example, should one lobe on the shaft wear more than another lobe on the same shaft or if the shaft itself is bent, etc., the engine with which the magneto is associated will not run properly due to inaccurate firing impulses. Consequently, it is desirable in testing a magneto to determine definitely that the high voltage discharges are exactly synchronized in relation to one another—i. e., that the high voltage impulses occur each 180° of magneto shaft rotation.

In testing magnetos it is also desirable to locate the magnetic neutral position of the magneto shaft, or the point when the magneto rotor is in that position in which one of its poles is exactly centered between the pole pieces or shoes of the magneto housing. When the rotor or rotating magnet is in this position the lines of flux do not flow through the core of the coil. It is also desirable to test and adjust the point opening or "edge gap" while the magneto is in operation, the edge gap being the number of degrees between neutral rotor position and the position of the rotor when the breaker contact points open. In order to perform a complete test upon a magneto it is also desirable to check the wear factor of the cam which operates the breaker points; to determine if there is any bend in the magneto shaft, or other misalignment which throws the cams off; and to test for any looseness in mounting of the rotor or magnet on the shaft, or any "weaving" of the parts. It will be obvious that these tests are much more reliable if made with the magneto in operation.

Many magnetos are built with impulse starter coupling in order to get the desired rate of magnetic change within the magneto at engine cranking speed. The impulse starter coupling device usually has a magneto drive member, a spring, a coupling drive member, and a notched arrester bar. The arrester bar is attached to the magneto frame and arrests the rotation of the magneto rotor. As the magneto shaft is turned the spring is wound up, and at a predetermined firing position the arrester bar releases the rotor, the spring unwinds rapidly, and the rotor takes a short quick turn to provide a rapidly changing magnetic field. Most impulse coupling devices are fully automatic in the sense that they engage and disengage automatically at about 400 R. P. M. or less, and such devices provide a "lag angle" or a number of degrees of spark retard so that the starting spark will occur at or near top dead center. In testing magnetos provided with impulse couplings it is desirable to test the wind up, or the point from where the impulse coupling takes hold to the point where it releases and snaps the rotor over rapidly, and it is also desirable to test the number of degrees of lag angle provided by the impulse coupling device. Also it is desirable to test or check and locate the lug angle which is herein defined as the angle of the impulse coupling drive lugs with relation to a horizontal line at the time of release or snap over of the impulse coupling device.

Finally, in testing magnetos it is desirable to test for the strength of the spark—i. e., the maximum length of the spark gap at low and high values.

I have provided and am herein disclosing and claiming an improved apparatus and method of performing these desired magneto tests in an efficient and simple manner, and my improved magneto testing apparatus has the further advantage that it is adapted for use with virtually every magneto on the market, both flange mounted and base mounted, and includes a novel and efficient coupling means adapted to be utilized with these various types of magnetos.

Other features and advantages of my invention will be apparent from the following description and from the drawings, in which:

Figure 2 is a vertical section through the apparatus of Figure 1, taken on the line 2—2 of Figure 1, and showing a base-mounted magneto in place thereon;

Figure 3 is a fragmentary perspective view of my improved testing apparatus with a flange-mounted magneto thereon;

Figure 4 is a vertical cross section taken on the line 4—4 of Figure 3, with the high voltage take-off removed from the apparatus and the magneto cover in place;

Figure 5 is a fragmentary perspective view of another modification of my invention especially adapted for so-called "distributor type" magnetos;

Figure 6 is another fragmentary perspective view of my apparatus mounting a flange-mounted magneto ready for test, and including means for connecting said magneto to test the spark output thereof;

Figure 7 is a perspective view of the mounting table used in mounting base-mounted magnetos;

Figure 8 is a perspective view of an adapter for use with my apparatus in coupling a magneto thereto;

Figure 9 is an enlarged longitudinal cross section through the adapter of Figure 8;

Figure 10 is a perspective view of an adapter for use in testing a magneto having impulse coupling;

Figure 11 is an enlarged end view of the adapter of Figure 10, looking from the right of Figure 10;

Figure 12 is a perspective view of an adapter ring for use with certain magnetos having female apertures for drive lugs in impulse coupling;

Figure 13 is a perspective view of the yoke used in mounting base-mounted magnetos; and Figure 14 is an enlarged view of a coupling loading spring used in my coupling arrangement.

Figure 1:
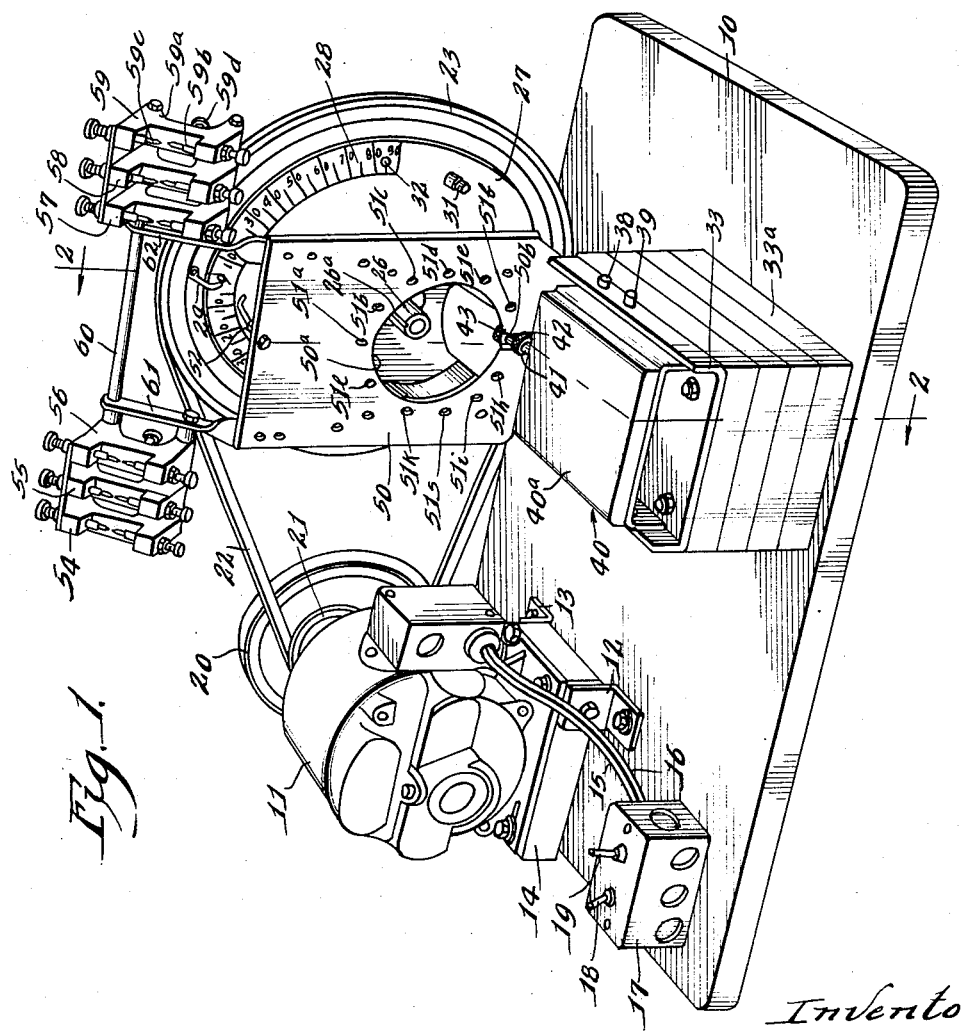
Figure 1 is a perspective view of my improved magneto testing apparatus arranged for mounting a base-mounted magneto thereon.

Referring now more particularly to the drawings, my improved apparatus is mounted upon a board or table 10, and comprises the testing apparatus proper and a drive means therefor. As illustrated in Figure 1 this drive means comprises a reversible motor 11 mounted on said board or table by means of the brackets 12 and 13 and the support 14, and connected by means of the cords 15 and 16 to a switch box 17. Within the switch box are two switches 18 and 19, the switch 18 being an on-off switch through which current is supplied to the motor from any appropriate source, as for example a conventional 110 volt source, and the switch 19 being a reversing switch to control the direction of operation of the motor.

Pulleys 20 and 21 are mounted on the shaft of the motor in order to provide low and high drive speeds for the testing apparatus, although it will be obvious that a variable speed motor may be used to give a continuous speed variation if desired. As illustrated in Figure 1 the endless drive belt 22 engages the pulley 21 and the rotatable member 23 so that the apparatus is connected for low speed operation, as for example 406 R. P. M. If desired the drive belt 22 may be arranged to engage the pulley 20, in which event the testing apparatus will be connected for high speed operation, as for example 1170 R. P. M.

The rotatable member 23, which is grounded, carries near its periphery illuminating means, here shown as the pair of oppositely spaced spark pins 24 and 25, and said rotatable member is mounted on a shaft 26 having a keyway 26a therein. A second member 27 is insulated from the rotatable member 23, and has a substantially semi-circular indicating portion of conducting material thereon. This indicating portion is shown in the drawings at 28 as being marked off in degrees, with its zero point being in the center, and being equally marked off in the form of a protractor in the amount of 90° on each side of the center. This conducting indicating portion is insulated from ground, and the conducting portion and the insulated member 27 are adjustable, these members being held by friction and being manually rotatable about the same axis as the shaft 26 by means of the handle 31. The conducting indicating portion 28 is adapted to be connected to a high voltage point on the magneto under test by a connection through the jack 32 as illustrated in Figures 3 and 6.

Means for mounting the magneto under test comprise a base member 33 which may be mounted on a riser block 33a. Said base member has a pair of supporting rods 34 and 35 extending transversely across its upper surface as shown in Figures 3, 5 and 6, said base member also has trunnion members 36, 37, 38 and 39 extending outwardly from opposite sides thereof between said rods. It is important that the two cross rods 34 and 35 be outside of these side trunnions for reasons that will appear hereafter.

A mounting table 40 is adapted to be secured adjustably on the base member 33. This table is shown in detail in Figure 7, and comprises a body portion 40a adapted to support a magneto, and cammed surfaces 40b and 40c adapted to cooperate with the supporting rods 34 and 35. From one end of the table a stud 41 extends, and on this stud are threaded two nuts 42 and 43. This stud is adapted to extend through a slot 50b in the vertical plate 50, with one of the nuts on either side of the plate as illustrated in Figures 1 and 2, or both nuts behind the plate. Adjustment of these nuts allows the table to be secured firmly upon the base member 33 in a desired position, the cammed surfaces 40b and 40c cooperating with the cross rods 34 and 35 to raise or lower the supporting surface 40 of the table as desired in order to bring the magneto shaft into alignment with the shaft 26 of the rotatable member 23. By this means I have found that I can accommodate virtually all base-mounted magnetos available, and any of these magnetos may be readily and securely mounted upon my testing equipment by merely adjusting the position of the nuts 42 and 43 to bring the magneto to the correct height.

If desired the shaft 26 of the rotatable member may be raised with respect to the mounting base and mounting table so that magnetos may be mounted upside down. This is desirable in some instances because a few types of magnetos have the impulse coupling so built that it operates only when the magneto is mounted in an upside down position.

Figure 2 shows a base mounted magneto 44 mounted upon my testing apparatus. As shown in said figure the mounting table 40 is adjusted to the proper elevation by means of the cam action of its cammed mounting surfaces 40b and 40c in cooperation with the cross rods 34 and 35, the desired position being selected by adjusting the nuts 42 and 43. The magneto is then placed on the table 40 and secured thereto by means of the yoke 45. This yoke is shown in detail in Figure 13 and comprises a U-shaped body portion, an adjusting stud 46 threaded into the center thereof, and the oppositely spaced holes 45a, 45b and 45c, 45d near the ends of the arms of said U-shaped member. As shown in Figure 2 this yoke is placed over the magneto so that one of the pairs of holes 45a—45b or 45c—45d engage a respective pair of trunnions, and the adjusting stud 46 is then used to clamp the magneto securely in place. It will be seen that by locating the cross rods 34 and 35 outside of both pairs of trunnions the base is kept from tilting, and each pair of trunnions is properly located for use with long and short magnetos respectively while the two pairs of holes in the yoke are similarly located. Thus in Figure 2, if the magneto 44 were of greater height, the pair of holes 45c—45d would be utilized rather than the pair of holes 45a—45b as illustrated.

A plate 50 extends vertically from the back of the base member 33, this plate having an opening 50a therethrough for the shaft of the magneto, and a slot 50b to accommodate the stud 41 at a desired elevation, and to provide means to lock a base-mounted magneto in place. The plate 50 also is utilized to mount flange-mounted magnetos, and for this purpose I provide the mounting holes 51a–51l. I prefer to space these holes 30° from each other equally around the opening 50a, with one mounting hole in vertical alignment with the shaft 26, since I have found that if the mounting holes are spaced 30° from each other and extend all the way around the opening 50a they will accommodate most kinds of flange-mounted magnetos, the mounting flange of many magnetos being spaced 0, 30 or some multiple of 30 degrees from the zero or neutral magnetic position. All commercially available flange mounted magnetos are marked as to how far the mounting holes are off neutral, and this is most often 0, 30, 60 or 90 degrees.

Extending from the top of the plate 50 in vertical alignment with the shaft 26 and the mounting hole 51a and approaching the indicating portion 28, is a zero indicator 52, this indicator providing a means for centering or zeroing the adjustable protractor scale when certain tests are performed on a magneto.

In Figures 3, 4 and 6 a flange-mounted magneto 53 is shown arranged on my apparatus, the mounting screws 53a and 53b serving to secure the magneto to the plate 50.

In Figure 3 the high voltage impulses from the magneto are shown coupled to the test equipment by the lead 53c which is plugged into the jack 32 and extends to a high voltage output point on the magneto.

As shown in Figures 1, 5 and 6, I provide an arrangement for testing the spark output from the magneto, this arrangement comprising a plurality (six as illustrated) of spark gap units 54, 55, 56, 57, 58 and 59, units which may be of the type illustrated and described in the co-pending application of Ralph Mansfield for a "Spark Gap Unit," filed October 26, 1946, as Serial No. 705,920, now abandoned. Since such spark gap units are described in detail in said co-pending application, they will not be described further here except to say that each unit comprises an insulating block, as the block 59a, a high voltage or "hot" electrode as the electrode 59b, a grounded electrode as the electrode 59c, and a "tickler" electrode as the electrode 59d. These units are mounted upon the grounded shaft 60, and this shaft is carried by brackets 61 and 62 which in turn are mounted upon the plate 50. Connection is made between the "hot" terminals of the respective spark gap units and the magneto by means of the leads 53d, 53e, 53f and 53g, and when the equipment is in operation the strength of the spark output from the magneto can be measured by adjusting the gap between the "hot" and grounded electrodes of the various spark gap units.

I provide a coupling arrangement such that any base-mounted or flange-mounted magneto may be easily and quickly mounted and coupled for test, and may be driven directly or through impulse coupling. The magneto 53 in Figure 4 is shown as being coupled to the shaft 26 for direct drive means of the coupling member 65. This coupling member is shown in detail in Figures 8 and 9 and comprises a cylindrical shell 66 having an annular shoulder 66a. Said shell has a circular opening of substantial depth at each end, one of said openings, as the opening 66b, being of greater diameter than the other opening, as the opening 66c. A keyway 66d extends longitudinally in the wall of the smaller opening 66c, and a plug 67 having the same external diameter as the larger opening 66b is press fit into said opening. Said plug has a tapered circular opening 67a therethrough, and a keyway 67b which extends longitudinally in the wall of the opening 67a, the parts being joined together in such manner that these keyways are aligned and the keyway 67b is in the exact axial plane as the keyway 66d.

I find that by constructing the coupling member 65 of two separate parts and press fitting the parts together as above described, I am able easily to provide the keyways 66d and 67b in exactly the same axial plane, or in alignment with each other. By making the opening 67a of tapered form as illustrated, I am able to couple onto magneto shafts of varying diameter while using only this one coupling adapter.

A spring 68 (Figure 14) encircles the reduced portion of the shell 66 and abuts against the shoulder 66a to provide a spring loaded coupling arrangement as shown in Figure 4. This arrangement enables me to use this single adapter to couple magnetos having varying shaft lengths, since the adapter shell 66 is coupled at one end to the shaft 26 by means of a key, the plug 67 is coupled at the other end to the magneto shaft by means of another key, and the spring 68 provides compensation for varying magneto shafts lengths.

The base-mounted magneto shown in Figure 2 is coupled through the impulse coupling of the magneto by means of the adapter 70 spring loaded by means of the spring 68 in the same manner as above described. The coupling provision of impulse coupling devices may vary, for example some impulse couplings having a 5/16 inch coupling provision, and some having a 1/4 inch coupling provision, so I provide two slots of different widths in the coupling adapter. This adapter is shown in Figures 10 and 11, and comprises a cylindrical member having a circular opening of substantial depth in one end. Thus in Figure 10 the cylindrical member is shown as comprising two portions, an enlarged portion 71 and a smaller portion 72, there being an annular shoulder 71a between the portions against which the spring 68 may abut. The portion 72 has a circular opening 72a therethrough, and has a pair of keyways 72b and 72c extending longitudinally in the wall of said opening. These keyways are spaced at a fixed angle to each other in the wall of said opening. The other end of the enlarged portion 71 has a pair of transverse slots 71b and 71c for coupling the adapter to the magneto. These slots are of different widths, and may be respectively 1/4 inch and 5/16 inch wide, and the slots extend at the same angle to each other as do the keyways 72b and 72c, each slot lying in the same axial plane as one of said keyways. Thus, as illustrated, the slot 71b lies in alignment with or in the same axial plane as the keyway 72b, and the slot 71c lies in the same axial plane as the keyway 72c. Again the spring 68 may be utilized to provide a spring loaded coupling to compensate for differences in the length of the magneto shaft.

Since some impulse couplers have female coupling slots rather than coupling projections thereon, I also provide an additional adapter ring, as the ring 73 shown in Figure 12. This ring has projections of different width on each of its ends, one projection, as the projection 73a, being adapted to couple into the regular adapter 70, and the other projection, as the projection 73b, being adapted to couple into one of the slots in the impulse coupling device, or vice versa, dependent upon the width of the slot in the impulse coupling devices.

Figure 5 shows a special adapter for use in my testing apparatus for testing "distributor type" magnetos, as the magneto 74, which are often used to replace battery type ignition systems in internal combustion engines. This type of magneto must be mounted vertically as shown in the drawing, since the impulse coupling is usually designed for vertical operation and will not operate if the magneto is mounted on its side. Consequently, I provide a housing 75 having an arrangement therein whereby the vertical shaft 76 may be coupled to the horizontal shaft 26 of the testing apparatus. Horizontal mounting arms 77 and 78 extend from the housing 75, and the vertical supporting shaft 79 is journaled through aligned openings in the arms 77 and 78, the position of this shaft being adjusted by means of the set screw 80, while an upper mounting arm 81 extends from the shaft 79 and is adapted to carry the magneto. The distributor terminals of the magneto may be connected to the "hot" terminals of the respective spark gap units by means of the leads 74a, 74b, 74c and 74d, and a similar connection between the magneto and the jack 32 may be made when desired.

In testing a magneto with my improved apparatus it is merely necessary to mount the magneto in the manner shown in either of Figures 2 or 4 and to couple its shaft to the shaft 26. As pointed out earlier this coupling may be direct as shown in Figure 4, or through the impulse coupling device as shown in Figure 2. The motor 11 is then turned on to drive the rotatable member 23 and the magneto shaft is driven in synchronism therewith. In the case of a two pole magneto there will be two high voltage impulses for each revolution of the shaft. Therefore, if the magneto is synchronized properly, a spark will jump from one of the oppositely spaced spark pins 24 and 25 to the indicating protractor 28 every 180° of revolution of the magneto shaft, and since the spark pins are also 180° apart both sparks will appear at the same point on the protractor scale. If the impulses are not synchronized exactly right the sparks will jump at different places on the protractor scale, and will appear to jump back and forth along said scale.

In testing a magneto on my improved apparatus, the location of true magnetic neutral of the magneto rotor is predetermined in the coupling arrangement. As heretofore mentioned, all commercially available magnetos are marked as to how far the mounting holes are off neutral and the mounting holes 51a—51l, which are spaced 30° from each other, allow the coupling to be made with the location of magnetic neutral predetermined. Furthermore the tapered opening 67a in the coupling member 65 insures exact centering of the magneto with consequential precise predetermination of neutral location. Therefore when testing a magneto, I adjust the rotatable scale 28 so that the indicator 52 points to zero on the scale, and before the shaft 26 is coupled to the magneto shaft, I rotate the rotatable member 23 so that one of the spark pins 24 is at the zero position on the scale. Having predetermined the position of the magneto shaft for neutral rotor location, I may test the edge gap of the magneto (the number of degrees between neutral rotor position and the position where the contact points open) by merely running the motor to rotate the magneto shaft in the proper direction and measuring the amount of rotation of the shaft from neutral position, this measurement being made by noting the point on the protractor scale where the spark jumps.

In order to test the impulse coupling wind up, it is merely necessary to move the rotatable member 23 slowly (as by hand) until resistance is just encountered, and then set the protractor zero point to one of the spark pins 24 or 25 and again rotate the member 23 in the same direction until the coupling operates. This may be determined by ear or by connecting a terminal to the protractor or to one of the spark gap units 53, 54, 55, 56, 57, 58 or 59 to obtain a spark. The spark pin which was originally set at zero will then indicate the number of degrees of edge gap on the protractor scale or impulse coupling windup.

To determine lag angle with impulse coupling the apparatus should be run at a speed sufficient to cut out the impulse coupling (usually more than 400 R. P. M.) and the protractor should be set to zero at the point where the spark jumps. Then the motor 11 should be shut off and the member 23 rotated slowly in the same direction until a spark again jumps or the impulse coupling is in some other manner, as by ear, seen to be operative. The reading from the initial zero point on the protractor to the point where the impulse coupling operated will now indicate the lag angle or the desired retard during cranking.

With my improved apparatus it is also possible to test the "lug angle" of an impulse coupling device, and so far as I am aware, no other means have heretofore been devised for making this test in a mechanical manner. The lug angle may be defined as the angle of the impulse coupling drive lugs with relation to a horizontal line at the point where the impulse coupling operates. These drive lugs comprise the driven member adapted to cooperate with the slots 71b and 71c of the impulse coupling adapter illustrated in Figures 10 and 11. Since these slots and the associated keyways 72b and 72c are fixed at a 90 degree angle as heretofore described, the magneto may be mounted on my apparatus so that these lugs assume a horizontal position when one of the spark pins 24 is over the zero indicator 52. In making this lug angle test, I set the protractor scale so that zero coincides with the indicator 52 and mount the magneto in the manner heretofore described with the lugs horizontal. I then rotate the magneto shaft manually until the impulse coupling operates, and measure the amount of rotation of the shaft from the first position, this measurement being obtained by noting the position of the spark pins.

While I have shown and described certain embodiments of my invention, it is to be understood that it is capable of many modifications. Changes, therefore, in the construction and arrangement may be made without departing from the spirit and scope of the invention as disclosed in the appended claims.

I claim:
1. Apparatus of the character described for testing a magneto having a rotatable shaft mem- ber, including: a rotatable member having a pair of illuminating means mounted thereon, said pair of illuminating means being spaced 180° from each other; a second member having a substantially semi-circular indicating portion adjacent which said illuminating means pass; means for mounting said magneto adjacent said rotatable member; means for driving one of said rotatable members; and coupling means connecting said rotatable member and said magneto shaft.

2. Apparatus of the character described for testing a magneto having a rotatable shaft member, including: a rotatable member having a pair of spark pins mounted thereon, said pair of spark pins being spaced 180° from each other; a second member having a substantially semi-circular indicating portion of conducting material insulated from said rotatable member and adjacent which said spark pins pass; means for mounting said magneto adjacent said rotatable member; means for driving one of said rotatable members; and coupling means connecting said rotatable member and said magneto shaft.

3. Apparatus of the character described for testing a magneto having a rotatable shaft member, including: a rotatable member having a pair of spark pins mounted thereon, said pair of spark pins being spaced 180° from each other; a second member having an adjustable indicating portion of conducting material insulated from said rotatable member and adjacent which said spark pins pass; a stationary zero indicator associated with said indicating portion; means for mounting said magneto adjacent said rotatable member; means for driving one of said rotatable members; and coupling means connecting said rotatable member and said magneto shaft.

4. Apparatus of the character described for testing a magneto having a rotatable shaft member, including: a rotatable member having a pair of spark pins mounted thereon, said pair of spark pins being spaced 180° from each other; a second member insulated from said rotatable member, said second member having a substantially semi-circular adjustable indicating portion of conducting material insulated from said rotatable member and adjacent which said spark pins pass, said portion being frictionally held against movement; a stationary zero indicator associated with said indicating portion; means for mounting said magneto adjacent said rotatable member; means for driving one of said rotatable members; and coupling means connecting said rotatable member and said magneto shaft to rotate in synchronism.

5. Apparatus of the character described for testing a magneto having a rotatable shaft member, including: a rotatable member having a pair of spark pins mounted thereon, said pair of spark pins being spaced 180° apart; a second member having an adjustable indicating portion of conducting material insulated from said rotatable member and adjacent which said spark pin passes; a stationary zero indicator adjacent said indicating portion; means for mounting said magneto adjacent said rotatable member, such means comprising a plate having an opening for said shaft member and a plurality of equally spaced mounting holes adjacent said opening; means for driving one of said rotatable members; and coupling means connecting said rotatable member and said magneto shaft.

6. Apparatus of the character described for testing a magneto having a rotatable shaft member, including: a rotatable member having a pair of spark pins mounted thereon, said pair of spark pins being spaced 180° from each other; a second member having an adjustable indicating portion of conducting material insulated from said rotatable member and adjacent which said spark pins pass; a zero indicator associated with said indicating portion; means for mounting said magneto adjacent said rotatable member, such means comprising a plate having an opening for said shaft member and a plurality of mounting holes adjacent said opening, said holes being spaced 30 degrees from each other with at least one hole in vertical alignment with said shaft opening; means for driving one of said rotatable members; and coupling means connecting said rotatable member and said magneto shaft.

7. Apparatus of the character described for testing a magneto having a rotatable shaft member, including: a rotatable member having illuminating means mounted thereon; a second member having an indicating portion adjacent which said illuminating means pass; means for mounting said magneto adjacent said rotatable member, such means comprising a base member having a spaced pair of supporting members extending transversely across its upper surface, and a mounting table having a cammed surface adapted to cooperate with said supporting members for adjustably positioning said mounting table on said base member; means for driving one of said rotatable members; and coupling means connecting said rotatable member and said magneto shaft.

8. Apparatus of the character described for testing a magneto having a rotatable shaft member, including: a rotatable member having at least one spark pin mounted thereon; a second member having at least a portion of conducting material insulated from said rotatable member and adjacent which said spark pin passes; adjustable means for mounting said magneto adjacent said rotatable member, such means comprising a base member having a pair of spaced supporting rods extending transversely across its upper surface, a mounting table having a cammed surface adapted to cooperate with said supporting rods, adjustable means for securing said table in a desired position on said base member, and a yoke for securing said magneto to said table; means for driving one of said rotatable members; and coupling means connecting said rotatable member and said magneto shaft.

9. Apparatus of the character described for testing a magneto having a rotatable shaft member, including: a rotatable member having a pair of oppositely spaced spark pins mounted thereon; a second member having an adjustable indicating portion of conducting material insulated from said rotatable member and adjacent which said spark pins pass; means for flange mounting said magneto adjacent said rotatable member, such means comprising a plate having an opening for said shaft member and a plurality of equally spaced mounting holes adjacent said opening; adjustable means for base mounting said magneto adjacent said rotatable member, such means comprising a base member having a pair of supporting rods spaced from each other and extending transversely across its upper surface and trunnion members extending outwardly from opposite sides of said base member between said rods, a mounting table having a cammed surface adapted to cooperate with said supporting rods, adjustable means for securing said table in a desired position on said base member, and a yoke adapted to cooperate with said trunnion members for securing said magneto to said table; means for driving said rotatable member; and coupling means connecting said rotatable member and said magneto shaft.

10. A method of testing a magneto having impulse coupling, comprising: coupling the shaft of the magneto to a rotatable member having illuminating means mounted thereon; slowly rotating said rotatable member until resistance is just encountered; obtaining an indication of the position of the shaft; slowly rotating said rotatable member in the same direction until said illuminating means are actuated; and measuring the amount of rotation of the shaft from said first mentioned position.

11. A method of testing for lag angle in a magneto having impulse coupling, comprising: rotating the magneto shaft to obtain a high voltage impulse with the impulse coupling cut out; obtaining an indication of the position of the shaft when the magneto generates a high voltage impulse; rotating the magneto shaft in the same direction with the impulse coupling operable until the impulse coupling operates; and measuring the amount of rotation of the shaft from said first mentioned position.

12. A method of testing for lag angle in a magneto having impulse coupling, comprising: rotating the magneto shaft at a speed sufficient to cut out the impulse coupling; obtaining an indication of the position of the shaft when the magneto generates a high voltage impulse, slowly rotating the magneto shaft in the same direction until the impulse coupling operates; and measuring the amount of rotation of the shaft from said first mentioned position.

13. A method of testing the lug angle in a magneto having impulse coupling, comprising: placing the magneto in a zero position with the lugs horizontal; rotating the magneto shaft until the impulse coupling operates; and measuring the angular rotation of the shaft from the zero position.

14. A method of testing the lug angle in a magneto having impulse coupling, comprising: providing a mounting for said magneto so that said lugs are horizontal; obtaining a zero indication of the position of the magneto shaft; slowly rotating said magneto shaft until the impulse coupling operates; and measuring the amount of rotation of the shaft from said first mentioned zero position.

15. A method of testing the edge gap in a magneto, comprising: coupling the shaft of the magneto to a rotatable member having illuminating means mounted thereon, said coupling predetermining the location of magnetic neutral of said magneto; rotating said rotatable member and shaft until said illuminating means are actuated; and measuring the amount of rotation of the shaft from said neutral position.

16. Apparatus of the character described for testing a magneto having a rotatable shaft member, including: a rotatable member having a pair of oppositely spaced illuminating means mounted thereon; a second member having a substantially semi-circular indicating portion adjacent which said illuminating means pass; means for mounting said magneto adjacent said rotatable member; means for driving one of said rotatable members; and coupling means connecting said rotatable member and said magneto shaft, said coupling means including a spring loaded connection between said rotatable member and said magneto shaft.

17. Apparatus of the character described for testing a magneto having a rotatable shaft member, including: a rotatable member having a pair of oppositely spaced spark pins mounted thereon; a second member having a substantially semi-circular indicating portion of conducting material insulated from said rotatable member and adjacent which said spark pins pass; means for mounting said magneto adjacent said rotatable member; means for driving one of said rotatable members; and coupling means connecting said rotatable member and said magneto shaft, said coupling means including a first coupling member having a slotted end, and a second coupling member having a projection extending from each end thereof, one of said projections being adapted to cooperate with said slot.

BENJAMIN ROZETT.

REFERENCES CITED

The following references are of record in the file of this patent:

UNITED STATES PATENTS

| Number | Name | Date |
|---|---|---|
| 1,046,148 | Butler | Dec. 3, 1912 |
| 1,316,244 | Kemble | Sept. 16, 1919 |
| 1,913,589 | Foulds | June 13, 1933 |
| 2,043,162 | Foster | June 2, 1936 |
| 2,148,817 | Kamenarovic | Feb. 28, 1939 |
| 2,355,211 | Erickson | Aug. 8, 1944 |
| 2,396,991 | Elkin | Mar. 19, 1946 |
| 2,404,017 | Wilkinson | July 16, 1946 |